May 14, 1968

G. H. W. DOBBERTIN 3,382,578

PORTABLE CUTTING TOOLS

Filed May 11, 1966

INVENTOR
GUNTHER HEINRICH WILHELM DOBBERTIN

BY

ATTORNEYS

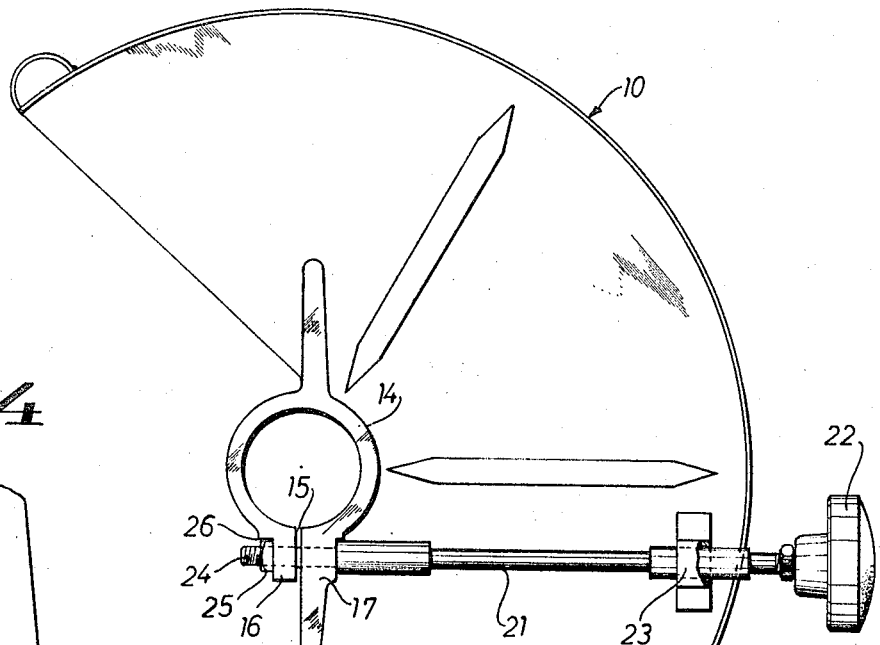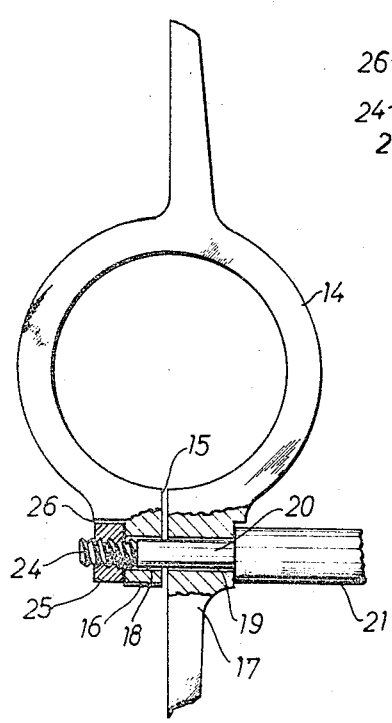

United States Patent Office 3,382,578
Patented May 14, 1968

3,382,578
PORTABLE CUTTING TOOLS
Gunther Heinrich Wilhelm Dobbertin, Ovre
Olskroksgatan 28, Gothenburg, Sweden
Filed May 11, 1966, Ser. No. 549,284
2 Claims. (Cl. 30—167)

ABSTRACT OF THE DISCLOSURE

The present portable power driven cutting tool includes a driven shaft for rotating a cutting tool, a hub, for supporting said shaft and having a cylindrical portion, an adjustable safety shield for said cutting tool and having a split bearing encircling said hub cylindrical portion and a knob controlled rod with threaded end extending through openings in said split bearing, a non-rotatable nut on said rod whereby said rod can pivot said safety shield about the cutting tool and the split bearing tightened or loosened by the rotation of said rod relative to said nut.

The present invention relates to portable cutting tools of the kind comprising a power unit (motor or engine) and a cutter disc driven thereby. More specifically, the invention relates to tools of this kind wherein the cutter disc is partly enclosed by a safety shield which is mounted on the hub for the cutter disc shaft in such a manner, that the shield may be rotated on the hub and clamped in various angular positions relative thereto.

The primary object of the invention is to provide an adjustable safety shield which may be very easily and rapidly adjusted from one position to another during operation of the cutter tool.

One embodiment of the present invention will be described herebelow with reference to the accompanying drawings wherein:

FIG. 2 is a side view to a larger scale of the safety shield seen from the opposite side to that illustrated in FIG. 1, FIG. 4 is a partly broken side view to a still larger scale of the hub-surrounding portion of the shield.

Figure 3:
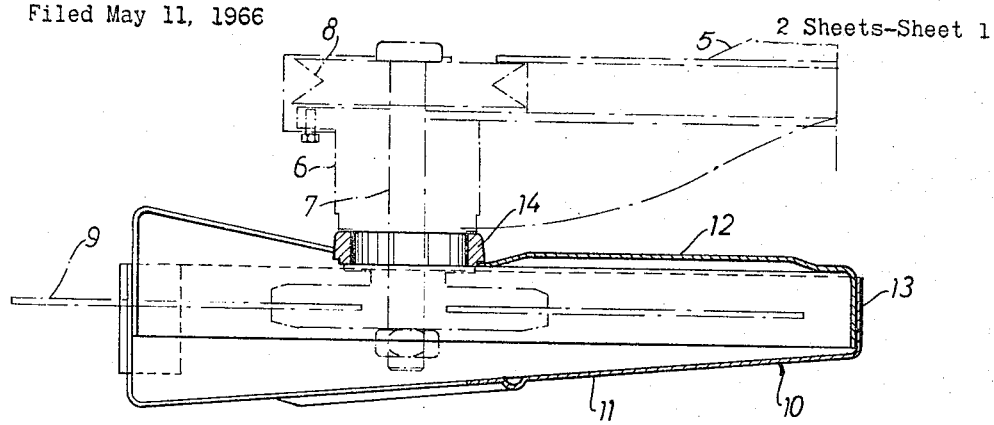
FIG. 3 is a section through the shield with adjacent parts of the cutter tool illustrated in dot-and-dash outline.
Figure 1:
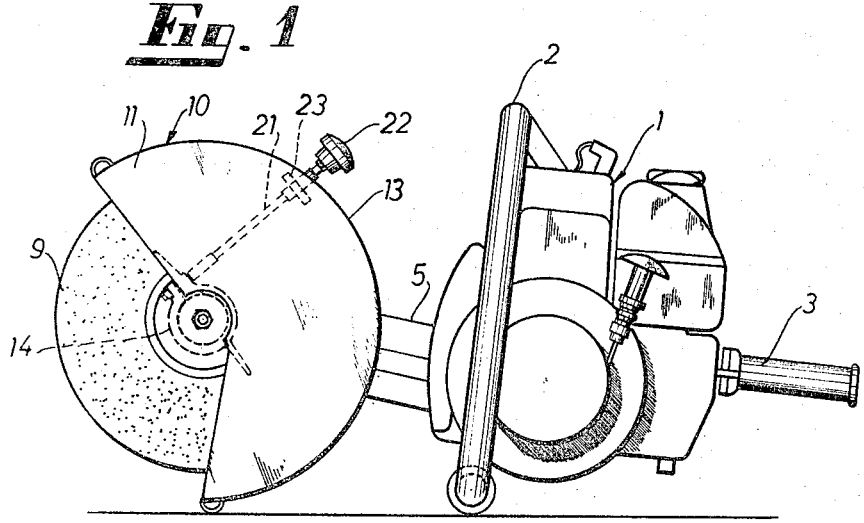
FIG. 1 is a side elevation showing the tool resting on a flat surface.

The power driven cutter tool illustrated in FIG. 1 includes an engine housing 1, a yoke shaped carrying handle 2 at the front end thereof and a straight handle 3 projecting rearwardly from the rear end of the engine housing. An arm 5 which is secured at one end to the engine housing and projects forwardly therefrom is provided at the opposite end with a hub 6 (indicated in broken lines in FIG. 3) for a shaft 7 which is parallel to the engine shaft (not shown). The shaft 7 is provided at one end with a pulley 8 for a belt which is driven by a second pulley on the engine shaft. The latter pulley and the belt are not shown in the drawings as they do not form any part of the invention proper. A cutting disc 9 is attached to that end of the shaft 7 which is opposite to the end provided with the pulley 8.

The cutter disc is partly enclosed by a safety shield 10 carried by the hub 6. The shield 10 is comprised of two plates 11 and 12 each having an arcuate edge concentric with the cutter disc shaft, said edges being joined by an arcuate wall 13. The shield 10 is mounted on the hub 6 for angular adjustment relative thereto by means of a bearing clamp 14 secured to the shield plate 12 at the center portion thereof for instance by welding. The clamp 14 is substantially in the form of a slotted ring, the slot being indicated at 15 in FIGS. 4 and 5. Two lugs 16 and 17 on opposite sides of the slot 15 are provided with registering through bores 18 and 19, respectively, for the reduced diameter end portion 20 of a rod 21 which extends alongside the plate 12 and has its opposite end projecting beyond the arcuate wall 13 of the hub and provided with a knob 22.

The rod 21 is rotatable in a guide member 23 secured to the plate 12 near the outer edge thereof. The reduced diameter end portion 20 of the rod 21 is provided with screw threads 24 at its outermost end portion which projects out beyond the lug 16. A square nut 25 in threaded engagement with the threads 24 has one of its flats facing a shoulder 26 on the ring 14 adjacent the lug 16, whereby the nut is secured against rotation. Upon turning of the rod 21 in clockwise direction by means of the knob 22 the split ring 14 will be tightened on the hub 6 so that it is retained by friction against angular displacement. Turning the rod 21 in the opposite direction will loosen the ring on the hub so that the shield may be displaced angularly to any desired position and then clamped in the new position by turning the rod 21 in the first-mentioned direction.

The rod 21 with its operating knob 22 provides a lever for conveniently shifting the angular position of the shield 10 with respect to the hub 6. Thanks to this arrangement, adjustment of the shield into any desired angular position may be effected with one hand very easily and rapidly.

The invention is not limited to the embodiment described hereabove and shown in the drawings as an example only, said embodiment being susceptible of various modifications with respect to its details without departing from the scope of the appended claim.

What I claim is:

1. In a portable power driven disc cutter, an adjustable safety shield for the disc cutter comprising a cutter disc, a driven shaft carrying said cutter disc, a hub for supporting said shaft and having a cylindrical portion, a safety shield partly enclosing said cutter disc, a split bearing fixedly attached to said shield and embracing the cylindrical portion of said hub whereby said shield is mounted on said hub for angular adjustment relative thereto, said split bearing having lugs on each side of the split thereof, with aligned holes in said lugs, said split bearing having a shoulder adjacent one of said lugs, a rod extending alongside said shield and having a threaded reduced end portion extending through said lug holes, a nut mounted against one of said lugs, held by said bearing shoulder against rotation and being in threaded engagement with said rod threaded end and a knob for relating said rod and pivoting said rod and thus said shield around said hub when said split bearing is loosened about said hub.

2. In a portable power driven disc cutter, an adjustable safety shield for the disc cutter as claimed in claim 1 including a bearing fixedly attached to said safety shield and having said rod rotatably mounted therethrough.

References Cited

UNITED STATES PATENTS 2,669,264  2/1954  Wilson _____ 143—159
2,963,056  12/1960 Rickford _____ 143—159

FOREIGN PATENTS 667,559  11/1938  Germany.

JAMES L. JONES, JR., Primary Examiner.